(12) United States Patent (10) Patent No.: US 12,477,854 B2
Cowley et al. (45) Date of Patent: Nov. 18, 2025

(54) IMAGE SENSOR SIGNAL PATH ROUTING

(71) Applicant: SEMICONDUCTOR COMPONENTS INDUSTRIES, LLC, Scottsdale, AZ (US)

(72) Inventors: Nicholas Paul Cowley, Wroughton (GB); Andrew David Talbot, Chieveley (GB); Stephen James Spinks, Shrivenham (GB)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 225 days.

(21) Appl. No.: 18/180,511

(22) Filed: Mar. 8, 2023

(65) Prior Publication Data

US 2024/0304647 A1 Sep. 12, 2024

(51) Int. Cl.
  *H10F 39/00* (2025.01)
  *H04N 25/633* (2023.01)
  *H04N 25/702* (2023.01)
  *H04N 25/703* (2023.01)
  *H04N 25/78* (2023.01)
  *H10F 39/18* (2025.01)

(52) U.S. Cl.
  CPC ......... *H10F 39/811* (2025.01); *H04N 25/702* (2023.01); *H04N 25/703* (2023.01); *H04N 25/78* (2023.01); *H10F 39/182* (2025.01); *H04N 25/633* (2023.01)

(58) Field of Classification Search
  CPC .... H10F 39/811; H10F 39/182; H10F 39/802; H10F 39/8057; H10F 39/809; H04N 25/702; H04N 25/703; H04N 25/78; H04N 25/633; H04N 25/79; H04N 25/71; H04N 25/77; H04N 25/772
  See application file for complete search history.

(56) References Cited

U.S. PATENT DOCUMENTS

| | | | |
|---|---|---|---|
| 2013/0200396 A1* | 8/2013 | Zheng | H10F 39/199 257/E31.127 |
| 2014/0077063 A1 | 3/2014 | Cho | |
| 2015/0189214 A1* | 7/2015 | Kurose | H01L 25/18 250/208.1 |
| 2017/0169265 A1 | 6/2017 | Wang | |
| 2019/0057995 A1 | 2/2019 | Liu | |
| 2019/0104271 A1* | 4/2019 | Isoda | H04N 25/778 |
| 2019/0165014 A1* | 5/2019 | Wada | H04N 25/42 |
| 2019/0253653 A1* | 8/2019 | Nakamura | H04N 25/69 |
| 2020/0288954 A1 | 9/2020 | Blanquart | |
| 2022/0415951 A1* | 12/2022 | Gu | H10F 39/014 |

* cited by examiner

*Primary Examiner* — Timothy J Henn
(74) *Attorney, Agent, or Firm* — Treyz Law Group, P.C.; Tianyi He

(57) ABSTRACT

An image sensor may include an image sensor pixel array. The image sensor pixel array may include active image sensor pixels and non-active image sensor pixels. A line of peripheral image sensor pixels may be coupled to a corresponding interconnect structure via a pixel signal path. The pixel signal path may include portions that overlap pass-through pixels and a keep-out region beyond an edge of the image sensor pixel array. Multiple interconnect structures may connect the image sensor pixel array implemented on a first integrated circuit die to pixel control and readout circuitry on a second integrated circuit die.

20 Claims, 7 Drawing Sheets

IMAGE SENSOR SIGNAL PATH ROUTING

BACKGROUND

This relates generally to imaging systems, and more specifically, to image sensors in imaging systems.

Image sensors are commonly used in electronic systems or devices to generate image data. In a typical arrangement, an image sensor includes an image sensor array having active image sensor pixels. Based on control signals received along control paths, the active image sensor pixels generate image signals in response to incident light. The generated image signals are read out along readout paths and are used to generate one or more image frames usable in the electronic system.

The image sensor array can also include other types of image sensor pixels (sometimes referred to herein as non-active image sensor pixels) such as reference image sensor pixels. At least some of the non-active image sensor pixels should similarly be controlled using corresponding control paths and/or read out using corresponding readout paths.

In some configurations, an image sensor may be constrained to having a certain number of signal paths along the columns and/or the rows in the pixel array (e.g., to meet a certain die size) and/or to have these signal paths at certain locations (e.g., to facilitate inter-die connections).

DETAILED DESCRIPTION

Electronic systems and/or devices may include one or more image sensors that gather incoming light to capture images. The image sensor may include one or more arrays of image sensor pixels. The pixels in the image sensor may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
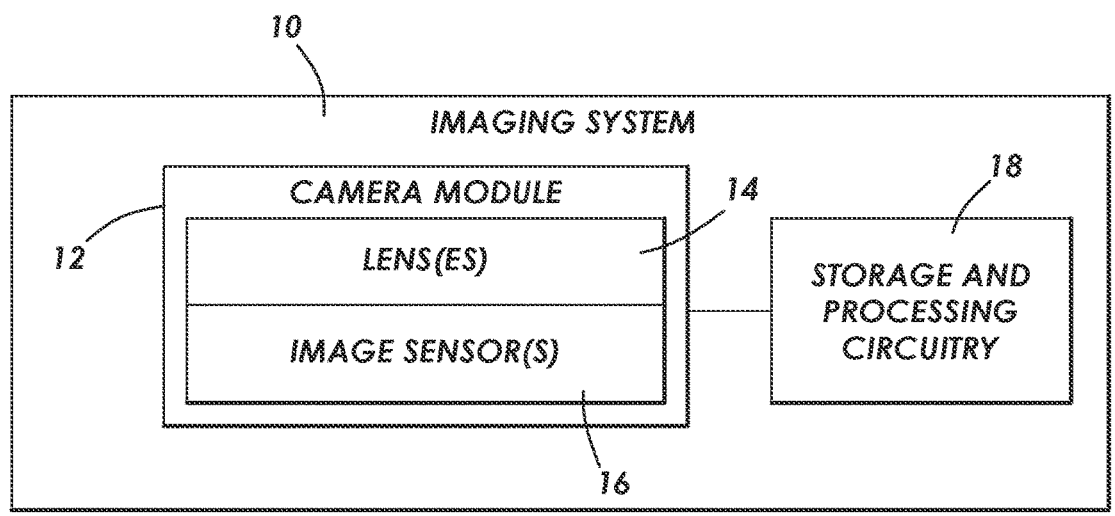
FIG. 1 is a diagram of an illustrative system having one or more image sensors in accordance with some embodiments.

FIG. 1 is a functional block diagram of an illustrative imaging system such as an electronic device that uses an image sensor to capture images. Imaging system 10 of FIG. 1 may be a portable electronic device such as a camera, a cellular telephone, a tablet computer, a webcam, a video camera, a video surveillance system, an automotive imaging system, a video gaming system with imaging capabilities, an augmented reality and/or virtual reality system, an unmanned aerial vehicle system such as a drone, an industrial system, or any other desired imaging system or device that captures image data.

Camera module 12, sometimes referred to as an imaging module, may be used to convert incoming light into digital image data. Camera module 12 may include one or more lenses 14 and one or more image sensors 16. When capturing images, light from a scene may be focused onto each image sensor 16 by one or more lenses 14. Image sensor 16 may include circuitry for converting analog pixel image signals into corresponding digital image data that is provided to storage and processing circuitry 18.

Storage and processing circuitry 18 may include one or more integrated circuits, each serving data storage functions and/or data computation or processing functions. As examples, the one or more integrated circuits may include image processing circuits such as digital signal processors, application-specific integrated circuits, general-purpose processors, microprocessors, microcontrollers, storage devices such as random-access memory and non-volatile memory, and/or other types of integrated circuits having processors and/or memories.

Storage and processing circuitry 18 may be implemented using components that are separate from the camera module and/or components that form part of the camera module. As one example, storage and processing circuitry 18 may be implemented using circuits that form part of an integrated circuit that includes an image sensor 16 or an integrated circuit within camera module 12. When storage and processing circuitry 18 is included on different integrated circuits than those of image sensors 16, the integrated circuits with storage and processing circuitry 18 may be vertically stacked or packaged with respect to the integrated circuits with image sensors 16.

Image data that has been captured by camera module 12 may be processed and stored using processing circuitry 18. As examples, an image processing engine on processing circuitry 18, an imaging mode selection engine on processing circuitry 18, and/or other types of processing engines on processing circuitry 18 may process the image data captured by camera module 12. Processing circuitry 18 may, if desired, provide processed image data to external equipment such as a computer, an external display, or other devices using wired and/or wireless communication paths.

Figure 2:
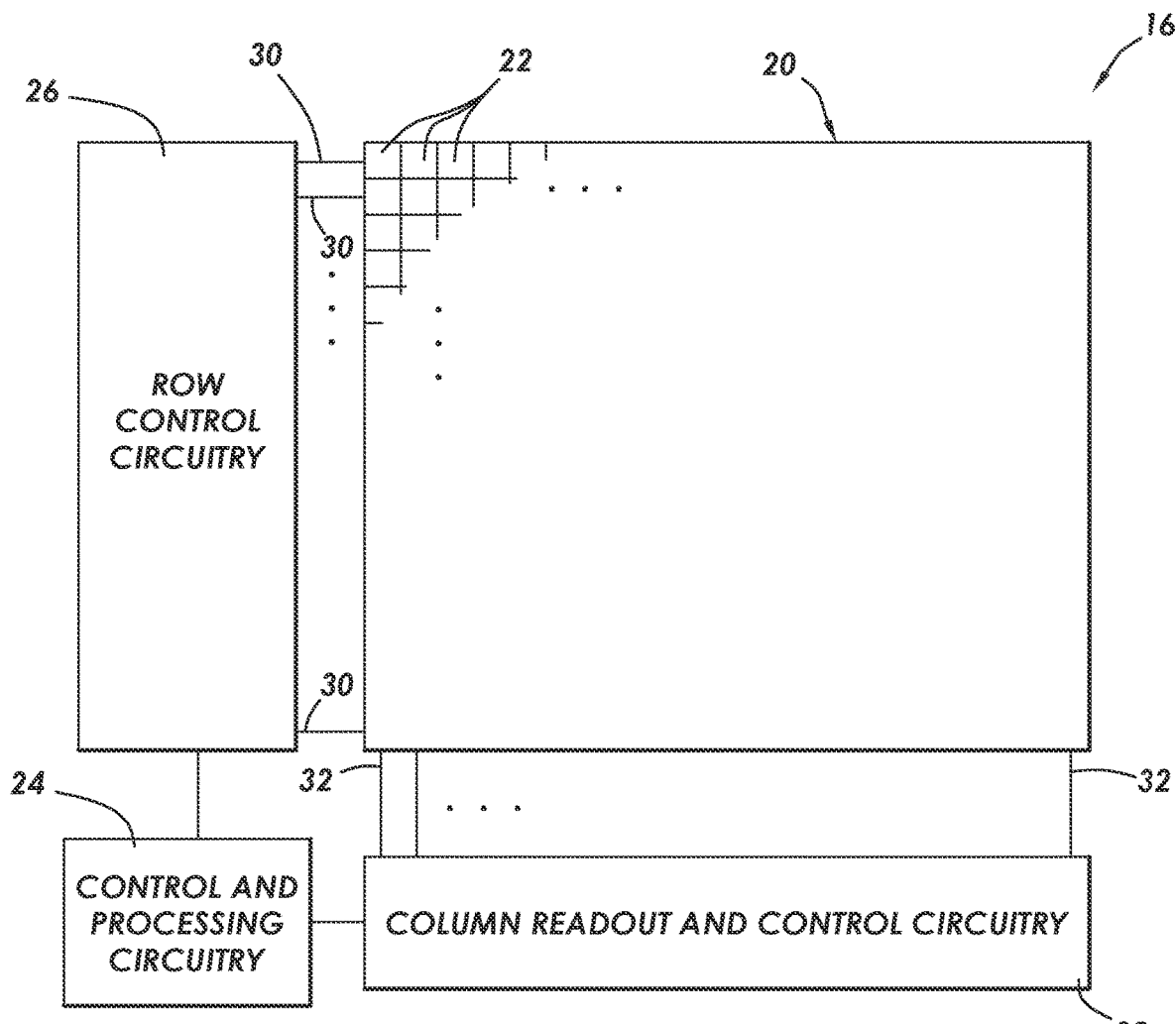
FIG. 2 is a diagram of illustrative image sensor circuitry having an image sensor pixel array and control and readout circuitry for the pixel array in accordance with some embodiments.

As shown in FIG. 2, image sensor 16 may include a pixel array such as pixel array 20 containing image sensor pixels 22, which are sometimes referred to herein as image pixels or pixels, arranged in rows and columns. A row of pixels or a column of pixels may sometimes be referred to herein generally as a line of pixels. Image sensor 16 may include control and processing circuitry 24, sometimes referred to herein as control circuitry 24, that controls the operation of pixel array 20. Pixel array 20 may contain, for example, hundreds or thousands of rows and columns of image sensor pixels 22. Control circuitry 24 may be coupled to pixel control circuitry such as row control circuitry 26 which includes row drivers that provide control signals to pixel array 20 and may be coupled to pixel readout circuitry such as column readout and control circuitry 28 that read out signals from pixel array 20.

Row control circuitry 26 may receive row addresses and/or signals indicative of row addresses from control circuitry 24 and supply corresponding row control signals such as reset, anti-blooming, row-select, charge transfer, dual conversion gain, and readout control signals to pixels 22 over conductive lines or paths 30 such as pixel row control paths. In particular, each pixel row may receive different control signals over a corresponding number of control paths such that each pixel row is coupled to multiple conductive paths 30. One or more conductive lines or paths 32 such as pixel column readout paths may be coupled to each column of pixels 22. Conductive paths 32 may be used for reading out image signals from pixels 22 and for supplying bias signals such as bias currents or bias voltages to pixels 22. As an example, when performing a pixel readout operation, a pixel row in pixel array 20 may be selected using row control circuitry 26 and image signals generated by the selected image pixels 22 in that pixel row can be read out along conductive paths 32.

Column readout circuitry 28 may receive image signals such as analog pixel values generated by pixels 22 over conductive paths 32. Column readout circuitry 28 may include memory or buffer circuitry for temporarily storing calibration signals such as reset level signals, reference level signals, and/or other non-image signals read out from array 20 and for temporarily storing image level signals read out from array 20, amplifier circuitry or a multiplier circuit, analog to digital conversion (ADC) circuitry, bias circuitry, latch circuitry for selectively enabling or disabling portions of column readout circuitry 28, or other circuitry that is coupled to one or more columns of pixels in array 20 for operating pixels 22 and/or for reading out image signals from pixels 22. ADC circuitry in readout circuitry 28 may convert analog pixel values received from array 20 into corresponding digital pixel values, sometimes referred to as digital image data or digital pixel data. Column readout circuitry 28 may supply digital pixel data from pixels 22 in one or more pixel columns to control and processing circuitry 24 and/or processor 18 (FIG. 1) for further processing and/or storage.

If desired, pixel array 20 may be provided with a filter array having multiple visible color or non-visible filter elements each corresponding to a respective pixel, thereby allowing a single image sensor to sample light of different colors or sets of wavelengths.

Image sensor pixels 22 may be formed in a semiconductor substrate using complementary metal-oxide-semiconductor (CMOS) technology or charge-coupled device (CCD) technology or any other suitable photosensitive device technology. Image sensor pixels 22 may be frontside illumination (FSI) image sensor pixels or backside illumination (BSI) image sensor pixels.

Figure 3:
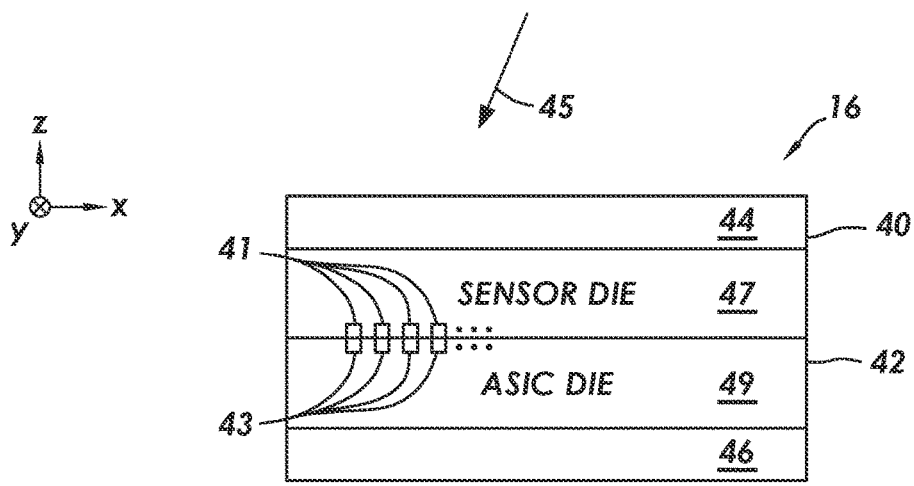
FIG. 3 is a diagram of an illustrative image sensor implemented using multiple integrated circuit dies in accordance with some embodiments.

In some illustrative arrangements described herein as an illustrative example, image sensor 16 may be implemented using an integrated circuit package or other structure in which multiple integrated circuit dies or chips are vertically stacked with respect to each other. FIG. 3 is a diagram illustrating an image sensor 16 implemented by mounting a first die to a second die. Die 40 may include a substrate such as semiconducting substrate 44 such as a silicon substrate on which a corresponding dielectric stack 47 with embedded (metal) routing layers is formed. Similarly, die 42 may include a substrate such as semiconducting substrate 46 such as a silicon substrate on which a corresponding dielectric stack 49 with embedded (metal) routing layers is formed.

First die 40 may be stacked on top of second die 42. In the example of FIG. 3, first die 40 is a sensor integrated circuit die, and second die 42 is an application-specific integrated circuit (ASIC) die. In this sensor die and ASIC die arrangement, sensor integrated circuit die 40 may implement pixel photosensitive elements such as photodiodes and other image sensor pixel elements such as pixel transistors, floating diffusion regions, and capacitors or other analog charge storage elements. Pixel photosensitive elements may be formed at substrate 44 and may receive incident light 45. Other pixel elements may be formed from substrate 44 and/or conductive structures in dielectric stack 47. ASIC die 42 may implement pixel control circuitry such as circuitry for operating the pixel elements by providing control signals to pixel transistors (e.g., pixel control circuitry 26 in FIG. 2). ASIC die 42 may implement pixel readout circuitry such as circuitry for receiving and processing image signals and other pixel-generated signals from the pixel elements (e.g., pixel readout circuitry 28 in FIG. 2). Accordingly, die 42 may sometimes be referred to as a control and readout integrated circuit die. Die 42 may also implement other support or peripheral circuitry for supporting the operation of image sensor 16 such as clock circuitry, input-output interface circuitry, and/or power management circuitry.

Die 40 may be mounted to die 42 in any suitable manner. As one illustrative example, die 40 may be bonded to die 42 at respective bonding surfaces on each die. Conductive interconnect structures 41 at the bonding surface of die 40 may be electrically connected to conductive interconnect structure 43 at the bonding surface of die 42. Accordingly, respective inter-die electrical connections may be made through pairs of interconnect structures 41 and 43, thereby facilitating signal conveyance between the two dies. As examples, conductive interconnect structures such as each interconnect structure 41 and/or 43 may include a die contact pad, a conductive via connected to the contact pads, one or more signal redistribution vias or layers, and/or one or more metal layers.

In one illustrative arrangement, die 40 may be bonded to die 42 using a hybrid bond process during which conductive structures such as metal interconnect structures 41 and 43 and non-conductive structures such as dielectric and/or semiconducting substrate layers at respective bonding surfaces of dies 40 and 42 may be fused together. If desired, die 40 may be mounted to die 42 in any other suitable manner such as using wire-bond connections, using flip-chip connections, and/or other connection mechanisms. Some or all of the mounting and inter-die connection process between dies 40 and 42 may occur at the wafer-to-wafer level, at the die-to-die level, and/or at the die-to-wafer level. Accordingly, depending on how die 40 is mounted to and/or is electrically connected to die 42, intervening connection elements such as solder bumps, micro-bumps, and/or copper pillars may exist between corresponding pairs of interconnect structures 41 and 43. If desired, an additional substrate or interposer may be used to mount die 40 to die 42.

The configuration in which first die 40 implementing pixel circuitry is mounted to second die 42 implementing pixel control and readout circuitry is described herein as an illustrative example. However, the function and separation of elements between sensor integrated circuit die 40 and ASIC die 42 as described above are merely illustrative. If desired, some pixel elements may be implemented outside of die 40 such as on die 42 or on a third die. If desired, the ASIC die functionalities of pixel control, pixel readout, and/or image processing may be implemented separately on multiple dies instead of being implemented within a single ASIC die 42. While die 42 is sometimes referred to herein as an ASIC die, die 42 and/or any other dies in image sensor 16 may implement its functionalities using any other types of devices such as field-programmable gate array (FPGA) devices and/or System-on-Chip (SoC) devices.

Figure 4:
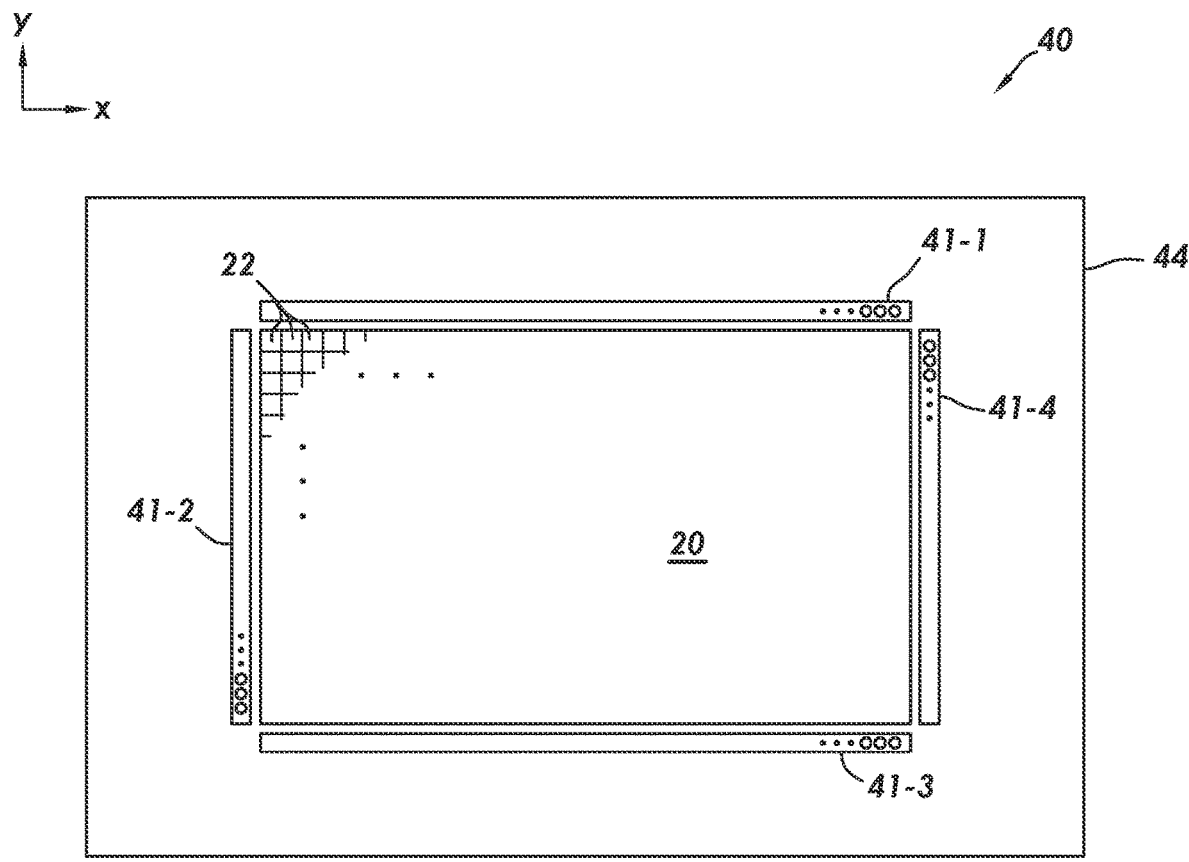
FIG. 4 is a plan view of an illustrative sensor integrated circuit die in accordance with some embodiments.

FIG. 4 is a plan view of a sensor integrated circuit die such as die 40, the peripheral side view of which is shown in FIG. 3. As shown in FIG. 4, die 40 includes substrate 44 which, in combination with dielectric stack 47 in FIG. 3 and the metal layers therein, form pixel elements such as transistors, photodiodes, and floating diffusion regions in pixels 22. Pixels 22 may be arranged in columns and rows that collectively form pixel array 20.

Pixel photosensitive elements may receive light from a first side of die 40 which can be the back side of substrate 44 facing away from metal routing layers and dielectric stack 47 (FIG. 3). Interconnect structures 41 may be formed at a second side of die 40 which can be the (front) side on which metal routing layers and dielectric stack 47 (FIG. 3) are formed. In the example of FIG. 4, the four sets of interconnect structures 41 (referring to the sets or fences of interconnect structures 41-1, 41-2, 41-3, and 41-4, collectively) may each have a linear outline adjacent to a different edge of the outline of pixel array 20 even though interconnect structures 41 and pixel array 20 are formed on different layers of die 40. The position and outline of interconnect structures 41 may facilitate a proper connection to corresponding interconnect structures 43 on die 42, as an example.

Figure 5:
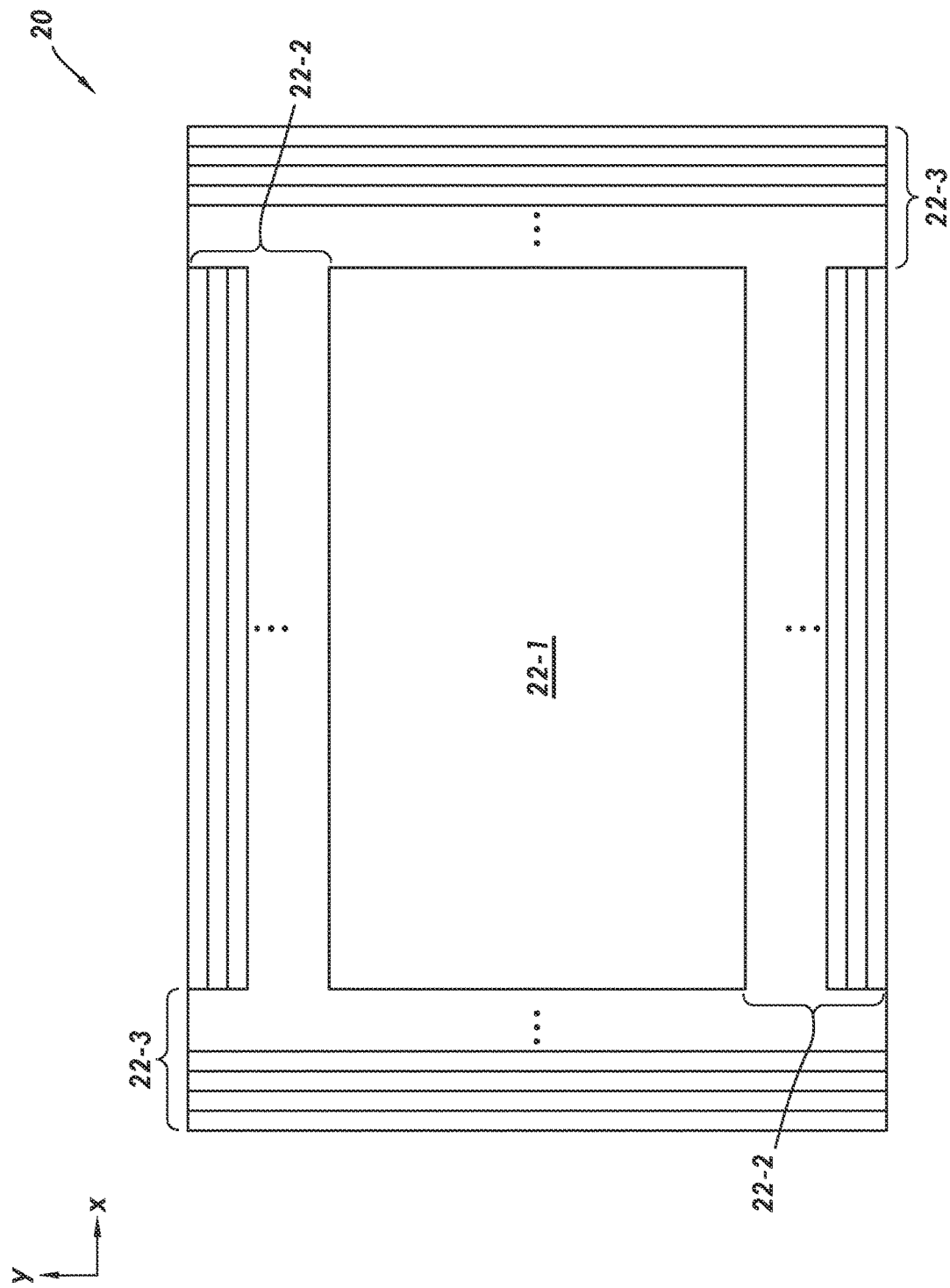
FIG. 5 is a diagram of an illustrative pixel array containing multiples types of pixels in accordance with some embodiments.

FIG. 5 is a diagram of an illustrative image senor pixel array 20 containing image sensors of different types at different relative positions within array 20. In particular, image sensor pixel array may include active image sensor pixels 22-1 at a central region of array 20. Active pixels 22-1 may be flanked along top and bottom sides by non-active pixels such as those forming top and bottom rows of non-active pixels 22-2. Active pixels 22-1 may be flanked along left and right sides by non-active pixels such as those forming left and right columns of non-active pixels 22-3.

Active pixels 22-1 generates image data corresponding to an image scene captured by the image sensor whereas non-active pixels 22-2 and 22-3 provide reference signals, testing signals, physical buffering, and other support data and/or functions to enhance the quality and/or other characteristics of the image data generated by active pixels 22-1. As examples, non-active pixels 22-2 and 22-3 may include reference pixels that may be optically shielded from incident light and that are operated using the same active pixel control signals to generate and read out reference signals indicative of pixel array noise level, may include optically dark (black) pixels that are shielded from incident light but are read out to obtain dark current signals, may include testing and/or calibration pixels that are operated using control signals to generate and read out test output signals for sensor debugging and calibration, may include buffer pixels that serve as physical buffers or alignment pixels ensuring the quality of active pixels 22-1 during manufacturing, and/or may include other types of non-active pixels.

If desired, some active pixels 22-1 may be formed in the peripheral regions of pixel array 20 such as in some of the pixel rows that otherwise would include non-active pixels 22-2 and/or in some of the pixel columns that otherwise would include non-active pixels 22-3. If desired, some non-active pixels 22-2 or 22-3 may be formed in the central region of pixel array 20 such as in a portion of pixel array 20 that otherwise would include active pixels 22-1.

Figure 6:
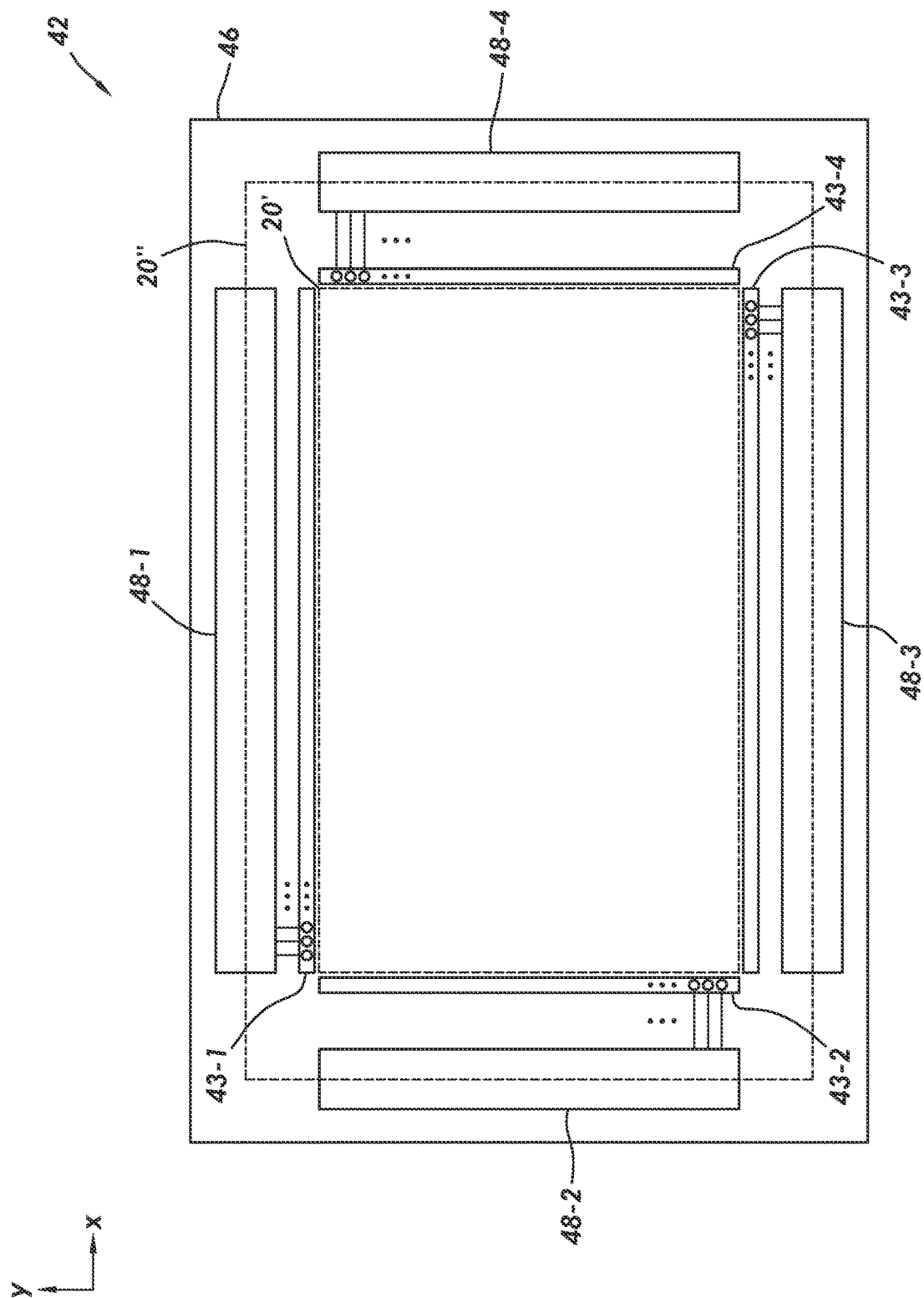
FIG. 6 is a plan view of an illustrative ASIC (application-specific integrated circuit) die in accordance with some embodiments.

FIG. 6 is a plan view of a pixel array control and readout die such as die 42, the peripheral side view of which is shown in FIG. 3. As shown in FIG. 6, die 42 includes substrate 46 which, in combination with dielectric stack 49 (FIG. 3) and the metal layers therein, form circuitry blocks 48 (referring to circuitry blocks 48-1, 48-2, 48-3, and 48-4, collectively). In particular, circuitry blocks 48 are each formed by fabricating passive and active electrical components that are interconnected in a corresponding manner to achieve one or more dedicated functions.

In the example of FIG. 6, circuitry blocks 48 may be formed along the peripheral edges of substrate 46. Circuitry blocks 48-1 and 48-3 may be formed along the top and bottom peripheral edges of substrate 46. Circuitry blocks 48-2 and 48-4 may be formed along the left and right peripheral edges of substrate 46. One or more of circuitry blocks 48 may implement row control circuitry 26 in FIG. 2 and/or other pixel control functions, may implement column readout circuitry 28 in FIG. 2 and/or other pixel readout functions, may implement control and processing circuitry 24 in FIG. 2 and/or other general timing control and/or signal processing functions, and/or may implement support and peripheral functions such as clocking functions, input-output interface function, and power management functions.

In one illustrative arrangement, circuitry blocks 48-1 and 48-3 may implement at least pixel readout functions by forming column readout circuitry 28 in FIG. 2 or generally pixel readout circuitry. As an example, circuitry block 48-1 may receive pixel output signals from a first set of pixels using a first set of columns lines coupled to the first set of pixels arranged in a first set of columns. In stacked-die configurations, column-wise readout circuits in block 48-1 may each be coupled to one or more columns of pixels using a corresponding pixel (column) signal path that includes an inter-die connection implemented by coupling an interconnect structure 43-1 on die 42 to a corresponding interconnect structure 41-1 on die 40 (FIG. 4). A set of interconnect structures 43-1 (sometimes referred to as a fence of interconnect structures 43-1) on substrate 46 configured to enable circuitry block 48-1 in accessing (e.g., reading out from) the first set of pixels is shown in FIG. 6 to have a linear outline extending parallel to the x-axis, as one example.

Circuitry blocks 48-3 may receive pixel output signals from a second set of pixels using a second set of column lines coupled to the second set of pixels arranged in a second set of columns. In stacked-die configurations, column-wise readout circuits in block 48-3 may each be coupled to one or more columns of pixels using a corresponding pixel (column) signal path that includes an inter-die connection implemented by coupling an interconnect structure 43-3 on die 42 to a corresponding interconnect structure 41-3 on die 40 (FIG. 4). A set of interconnect structures 43-3 (sometimes referred to as a fence of interconnect structures 43-3) on substrate 46 configured to enable circuitry block 48-3 in accessing (e.g., reading out from) the second set of pixels is shown in FIG. 6 to have a linear outline extending parallel to the x-axis, as one example. If desired, one of circuitry blocks 48-1 and 48-3 and corresponding interconnect structures 43 may be omitted, and the other one of circuitry blocks 48-1 and 48-3 may be coupled to all of the column lines and receive all pixel output signals from all of the pixels in the array.

In one illustrative arrangement useable in combination with the above-mentioned arrangements of circuitry blocks 48-1 and/or 48-3, circuitry blocks 48-2 and 48-4 may implement at least pixel control functions by forming row control circuitry 26 in FIG. 2 or generally pixel control circuitry. As an example, circuitry block 48-2 may provide pixel control signals to a first set of pixels using a first set of row lines coupled to the first set of pixels arranged in a first set of rows. In stacked-die configurations, row-wise control signal driver circuits in block 48-2 may each be coupled to one or more rows of pixels using one or more corresponding pixel (row) signal paths that includes corresponding inter-die connection(s) implemented by coupling interconnect structure(s) 43-2 on die 42 to corresponding interconnect structure(s) 41-2 on die 40 (FIG. 4). A set of interconnect structures 43-2 (sometimes referred to as a fence of interconnect structures 43-2) on substrate 46 configured to enable circuitry block 48-2 in accessing (e.g., providing control signals to) the first set of pixels is shown in FIG. 6 to have a linear outline extending parallel to the y-axis, as one example.

Circuitry blocks 48-4 may provide pixel control signals to a second set of pixels using a second set of row lines coupled to the second set of pixels arranged in a second set of rows. In stacked-die configurations, row-wise control signal driver circuits in block 48-4 may each be coupled to one or more rows of pixels using one or more corresponding pixel (row) signal paths that includes corresponding inter-die connection(s) implemented by coupling interconnect structure(s) 43-4 on die 42 to corresponding interconnect structure(s) 41-4 on die 40 (FIG. 4). A set of interconnect structures 43-4 (sometimes referred to as a fence of interconnect structures 43-4) on substrate 46 configured to enable circuitry block 48-4 in accessing (e.g., providing control signals to) the second set of pixels is shown in FIG. 6 to have a linear outline extending parallel to the y-axis, as one example. If desired, one of circuitry blocks 48-2 and 48-4 and corresponding interconnect structures 43 may be omitted, and the other one of circuitry blocks 48-2 and 48-4 may be coupled to all of the row lines and provide all pixel control signals to all of the pixels in the array.

If desired, sensor integrated circuit die 40 and ASIC die 42 may be implemented based on stitching. In other words, dies 40 and 42 may each be a stitched die. In particular, one or more stitched dies formed using one-dimensional or two-dimensional stitching may be constructed using a step and repeat exposure process using a small number of tiles, such as four or five tiles, contained on a single reticle set. As an example, each tile may be exposed at multiple locations across sensor die and/or the ASIC die, thereby forming multiple instances of the same circuitry at these locations.

As an example, a reticle set may include a left-and-right peripheral tile, a top-and-bottom peripheral tile, a corner peripheral tile, and a center tile. Sensor integrated circuit die 40 may implement a pixel array 20 by stitching multiple instances of the center pixel array tile to form a pixel array 20. If desired, the center tiles may also form non-pixel circuitry such as some portions of the pixel control and/or readout circuitry and other functional circuitry. ASIC die 42 may implement one or more of circuitry blocks 48-1, 48-2, 48-3, and 48-4 by stitching multiple instances of the left-and-right peripheral tile, and the top-and-bottom peripheral tile and implement other circuitry blocks such as clocking circuitry, power management circuitry, and/or input-output interface by stitching multiple instances of the corner peripheral tile. If desired, the peripheral and corner tiles may also define some image sensor pixel circuitry and form some portions of the pixel array.

If desired, sensor integrated circuit die 40 and ASIC die 42 may be formed using other processes. In other words, one or both of dies 40 and 42 may not be stitched dies. Furthermore, if desired, image sensor 16 as shown in FIG. 2 may be formed using a monolithic architecture in which at least pixel array 20, row control circuitry 26, and column readout circuitry 28 are formed on a single integrated circuit die.

In one illustrative image sensor configuration, when die 40 is mounted to die 42, pixel array 20 on die 40 may have a footprint 20' with respect to circuitry blocks 48 and interconnect structures 43 on die 42. Although pixel array 20 and circuitry blocks 48 are not co-planar with each other because they are formed on dies, circuitry blocks 48 may still run along the peripheral edges of footprint 20' of pixel array 20 in this image sensor configuration, thereby facilitating the desired column and row signal path routing in the manner shown with lines 30 and 32 in FIG. 2 through inter-die connections using interconnect structures 41 and 43 as shown in FIG. 3. More specifically, interconnect structures 43 and corresponding interconnection structures 41 may extend along each of the peripheral sides of outline 20' to simplify signal path routing between pixels in array 20 and circuitry blocks 48.

However, this illustrative image senor configuration undesirably limits the number of pixels for a given die size, thereby limiting the active pixel resolution, the number and therefore capabilities of non-active pixels such as noise compensation, and/or generally other desired attributes of the pixel array.

In some illustrative image sensor configurations described herein as an illustrative example, pixel array 20 may be implemented with a larger footprint or outline such as footprint 20". In other words, pixel array 20 in these illustrative image sensor configurations may overlap and have peripheral pixels that extend laterally beyond and therefore overlap the fences of interconnect structures 43 and that overlap one or more of circuitry blocks 48.

While, for the same die size, using a pixel array with footprint 20" relative to a pixel array with footprint 20' enables the inclusion of additional active and/or non-active pixels. The additional pixels may still require signal path routing to corresponding circuitry blocks 48 via inter-die interconnections, which can be challenging.

Figure 7:
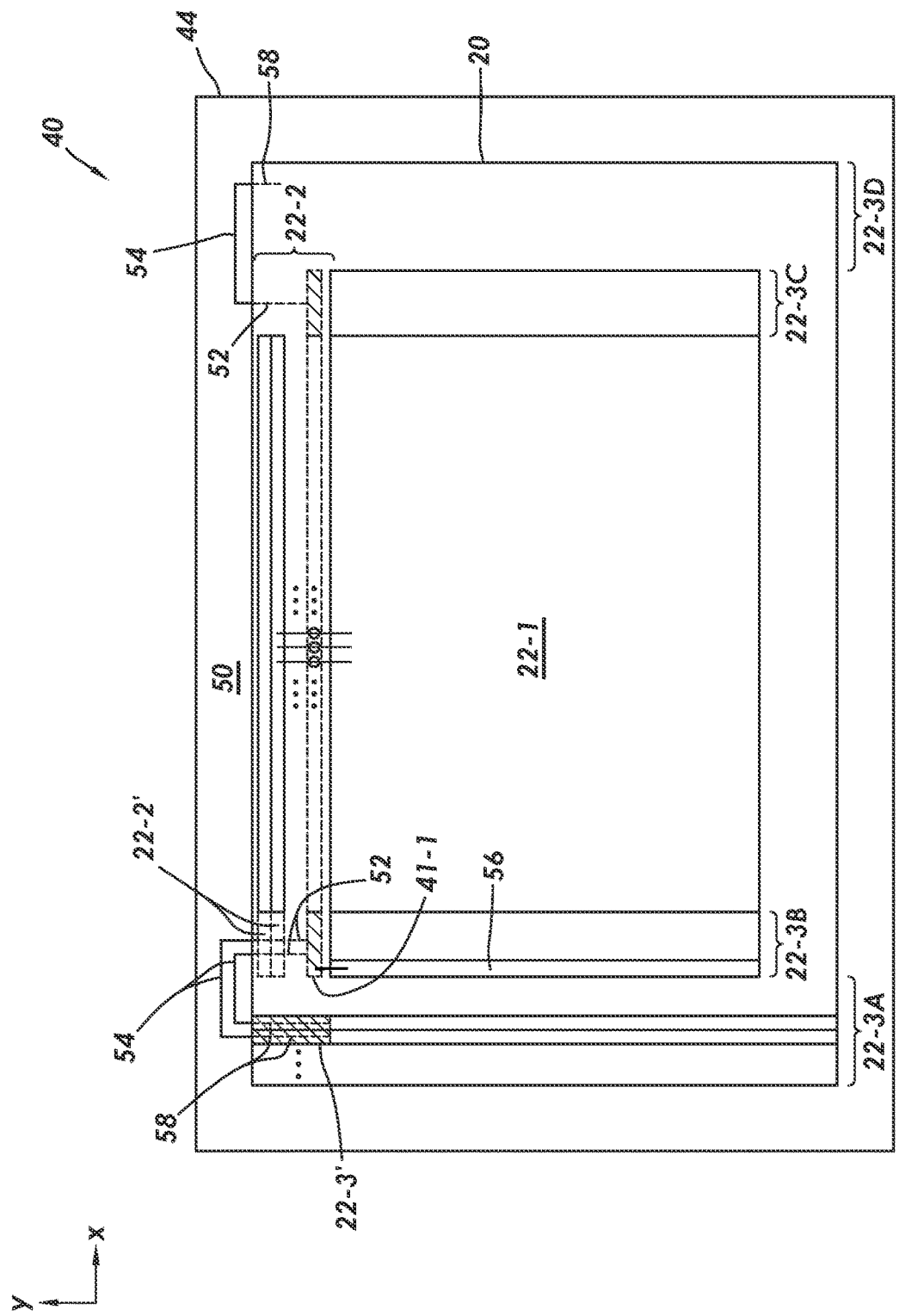
FIG. 7 is a plan view of an illustrative sensor integrated circuit die having offset vertical signal path routing in accordance with some embodiments.
Figure 8:
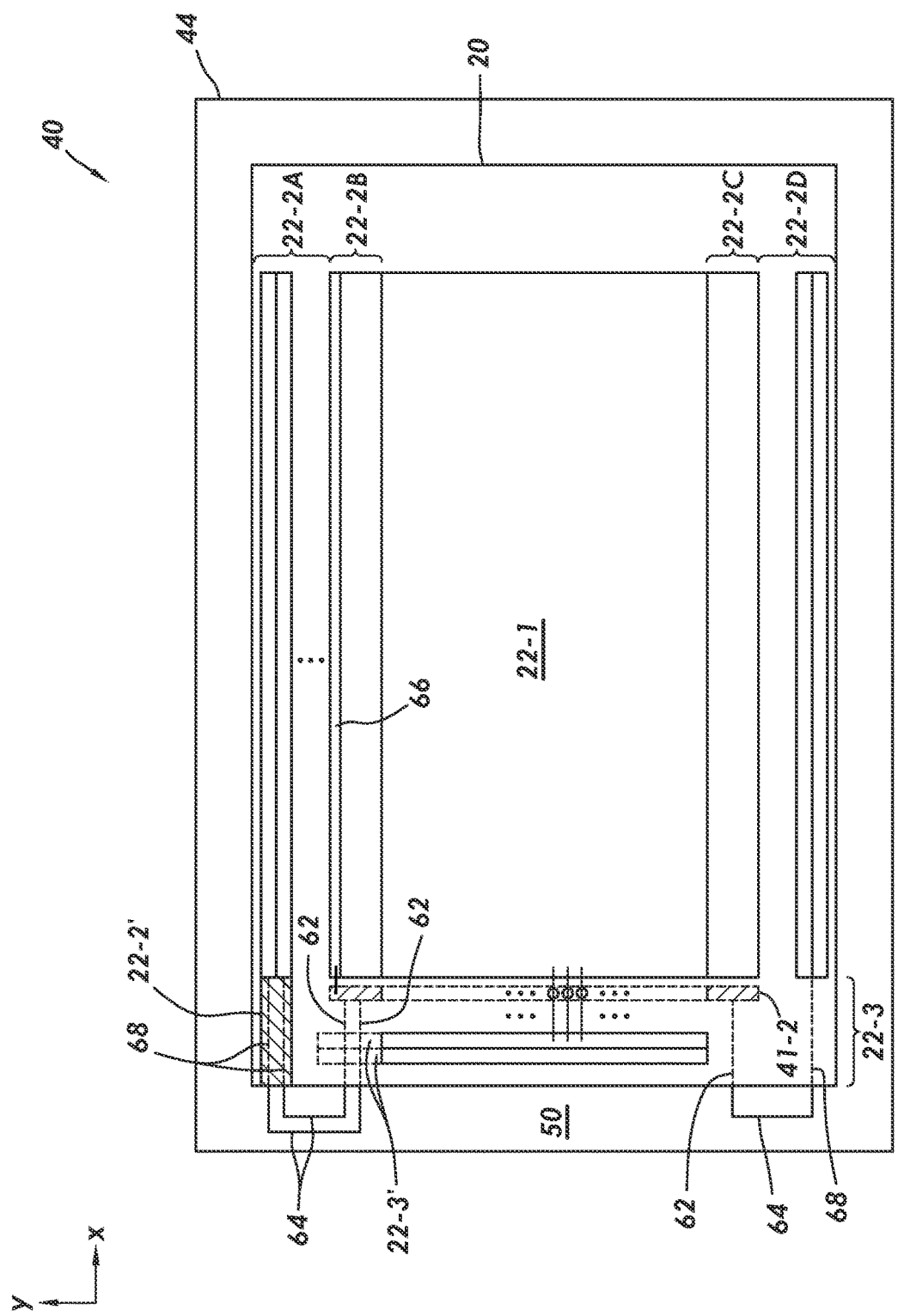
FIG. 8 is a plan view of an illustrative sensor integrated circuit die having offset horizontal signal path routing in accordance with some embodiments.

FIGS. 7 and 8 show illustrative signal path routing schemes that may be used separately and/or in combination to facilitate the implementation of appropriate signals paths coupling image sensor pixels on a first die to circuitry blocks on a second die. In particular, FIG. 7 shows illustrative vertical signal path routing schemes that may be implemented on image sensor die 40.

In the example of FIG. 7, pixel array 20 (e.g., having footprint 20" in FIG. 6) may include any suitable number of active pixels and non-active pixels (e.g., reference pixels, optically dark pixels, buffer pixels, non-operational or pass-through pixels, and/or other types of non-active pixels) arranged in any suitable pattern across pixel array 20. In configurations where pixels in array 20 are arranged in rows and columns, each active or non-active pixel may be in a corresponding row and a corresponding column in pixel array 20.

Only some of the pixels in pixel array 20 are shown in FIG. 7 (e.g., to illustrate the vertical signal path routing schemes). However, in general, pixels may span the entirety of the area of pixel array 20. As shown in FIG. 7, pixel array 20 includes a central region of active pixels 22-1, which is sometimes referred to herein as an array or sub-array of active pixels 22-1. The central region of active pixels 22-1 may be flanked on its top side by rows of pixels 22-2 in a top peripheral region and similarly be flanked on its bottom side by rows of pixels 22-2 in a bottom peripheral region (not explicitly shown in FIG. 7). The central region of active pixels 22-1 may also be flanked on its left side by columns of pixels 22-3A and 22-3B in a left peripheral region and similarly be flanked on its right side by columns of pixels 22-3C and 22-3D in a right peripheral region.

Pixels 22 from different region of the array may be coupled to inter-die interconnect structures 41. In the example of FIG. 7, pixel signal path routing to the set of interconnect structures 41-1 having a linear outline extending parallel to the x-axis is illustrated. If desired, an analogous pixel signal path routing scheme as described in connection with the set of interconnect structures 41-1 may be used to connect to the set of interconnect structures 41-3 (FIG. 4).

The set of interconnect structure 41-1 may include a middle subset of interconnect structures 41-1. Routing to the middle subset of interconnect structures 41-1 may use linear column paths. In particular, central columns of pixels containing active pixels 22-1 and some of the pixels 22-2 in the top and/or bottom peripheral regions may each be coupled to a corresponding interconnect structures 41-1 in the middle subset via a corresponding linear column path. Each of these linear column paths may include a first portion that extends from pixels in the top peripheral region routed downward (in the −y direction) to the middle subset of interconnect structures 41-1 and a second portion that extends from active pixels 22-1 in the central region routed upward (in the +y direction) to the middle subset of interconnect structures 41-1.

While routing from central columns of pixels to the middle subset of interconnect structures 41-1 can be achieved using linear column paths, peripheral columns of pixels may be coupled to the peripheral subset of interconnect structures 41-1 (shaded in FIG. 7) using meandering signal paths having multiple linear path portions. In the example of FIG. 7, peripheral columns of pixels 22-3A may be coupled to the peripheral subset of interconnect structures 41-1 via meandering pixel signal paths. Each of these meandering pixel signal paths may include a first path portion 52, a second path portion 54, and optionally a third path portion 58.

Each path portion 52 may extend between a peripheral interconnect structure 41-1 and the top edge of pixel array 20. Path portions 52 may extend across and overlap pixels in the top peripheral region such as pixels 22-2'. These pixels 22-2' may be non-operational or pass-through pixels. Path portion 58, if present, may similarly extend across and overlap some non-operational or pass-through pixels 22-3'. Each path portion 58 may therefore extend between the operational pixels in columns 22-3A and the top edge of pixel array 20. In other arrangements, operational pixels in columns 22-3A may extend to the top edge of pixel array 20 and path portion 58 overlapping non-operational pixels may be omitted.

Pixel array 20 may have peripheral edges that define a rectangular outline. Beyond the rectangular outline of pixel array 20 may be a keep-out region or keep-out zone 50 on substrate 44. Keep-out region 50 may extend around all peripheral edges of pixel array 20 and surround pixel array 20. Keep-out region 50 may define an area that extends beyond array 20 and is typically left devoid of electrical component and structures such as conductive metal traces, conductive contact pads, and conductive metal vias.

In the illustrative routing scheme shown in FIG. 7, the meandering pixel signal paths that couple peripheral columns of pixels 22-3A to the peripheral subset of interconnect structures 41-1 may make use of the portion of keep-out region 50 along the top edge of pixel array 20. In particular, path portion 54 may be formed from conductive structures (e.g., conductive metal traces) overlapping keep-out zone 50. Each path portion 54 may extend between and connect a corresponding path portion 58 and a corresponding path portion 52.

Because peripheral columns of pixels 22-3A are coupled to at least some of the peripheral subset of interconnect structures 41-1, these coupled interconnect structures 41-1 may be unavailable for coupling to peripheral columns of pixels 22-3B aligned to the peripheral subset of interconnect structures 41-1 along the y-dimension. In some instances, some of these pixels 22-3B may be buffer pixels or other types of non-active pixels that do not require connections to pixel control and/or readout circuitry via interconnect structures 44-1. In other instances, the peripheral subset of interconnect structures 44-1 may have some interconnect structures 44-1 that are reserved for connections to some of the columns of pixels 22-3B (e.g., one or more pixel columns 56) and therefore are not connected to peripheral columns of pixels 22-3A using path portions 52, 54, and 58. In other words, one or more pixel columns 56 may be coupled to corresponding interconnect structures 41-1 in the peripheral subset using linear signal paths similar to how central columns of pixels are coupled to the middle subset of interconnect structures 41-1.

An analogous routing scheme may be employed to couple peripheral columns in the right peripheral region of pixel array 20 to the corresponding right-side peripheral subset of interconnect structures 41-1. In particular, peripheral columns of pixels 22-3D may be coupled to the right-side peripheral subset of interconnect structures 41-1 via corresponding path portions 52, 54, and 58. Path portions 52 and 58 may overlap corresponding non-operational or pass-through pixels in different columns along the same and/or different rows. Path portion 54 may also overlap keep-out region 50 along the top edge of pixel array 20. Columns of pixels 22-3C may which are aligned to the peripheral subset of interconnect structures 41-1 along the y-dimension may omit connections to the peripheral subset of interconnect structures 41-1 or may be coupled to reserved interconnect structures 41-1 in the peripheral subset.

In illustrative configurations described herein as an example, interconnect structures 41-1 on die 40 mates with corresponding interconnect structures 43-1 on die 42 to connect to circuitry block 48-1 (FIG. 6). In arrangements in which circuitry block 48-1 implements pixel readout circuitry (e.g., readout circuitry 28 in FIG. 2), pixel signal paths routed to interconnect structures 41-1 may be referred to herein as pixel readout paths. These pixel readout paths may convey corresponding pixel output signals (e.g., image signals from the central pixel columns, reference signals from the peripheral pixel columns, and other pixel signals) from at least a portion of pixel array 20 to circuitry block 48-1. If desired, circuitry block 48-1 may implement pixel control functions and may therefore supply pixel control signals over the pixel signal paths to the portion of pixel array 20.

FIG. 8 shows illustrative horizontal signal path routing schemes that may be implemented on image sensor die 40. In the example of FIG. 8, the same pixel array 20 as in FIG. 7 is shown. Similar to FIG. 7, only some of the pixels in pixel array 20 are shown in FIG. 8 (e.g., to illustrate the horizontal signal path routing schemes). However, in general, active pixels and non-active pixels may span the entirety of the area of pixel array 20.

As shown in FIG. 8, the central region of active pixels 22-1 may be flanked on its top side by rows of pixels 22-2A and 22-2B in a top peripheral region and similarly be flanked on its bottom side by rows of pixels 22-2C and 22-2D in a bottom peripheral region. The central region of active pixels 22-1 may also be flanked on its left side by columns of pixels 22-3 and 22-3 in a left peripheral region and similarly be flanked on its right side by columns of pixels 22-3 in a right peripheral region (not explicitly shown in FIG. 8).

In the example of FIG. 8, pixel signal path routing to the set of interconnect structures 41-2 having a linear outline extending parallel to the y-axis is illustrated. If desired, an analogous pixel signal path routing scheme as described in connection with the set of interconnect structures 41-2 may be used to connect to the set of interconnect structures 41-4 (FIG. 4).

The set of interconnect structure 41-2 may include a middle subset of interconnect structures 41-2. Routing to the middle subset of interconnect structures 41-2 may use linear row paths. In particular, central rows of pixels containing active pixels 22-1 and some of the pixels 22-3 in the left and/or right peripheral regions may each be coupled to a corresponding interconnect structures 41-2 in the middle subset via a corresponding linear row path. Each of these linear row paths may include a first portion that extends from pixels in the left peripheral region routed rightward (in the +x direction) to the middle subset of interconnect structures 41-2 and a second portion that extends from active pixels 22-1 in the central region routed leftward (in the −x direction) to the middle subset of interconnect structures 41-2.

While routing from central rows of pixels to the middle subset of interconnect structures 41-2 can be achieved using linear row paths, peripheral rows of pixels may be coupled to the peripheral subset of interconnect structures 41-2 (shaded in FIG. 8) using meandering signal paths having multiple linear path portions. In the example of FIG. 8, peripheral rows of pixels 22-2A may be coupled to the peripheral subset of interconnect structures 41-2 via meandering pixel signal paths. Each of these meandering pixel signal paths may include a first path portion 62, a second path portion 64, and optionally a third path portion 68.

Each path portion 62 may extend between a peripheral interconnect structure 41-2 and the left edge of pixel array 20. Path portions 62 may extend across and overlap pixels in the left peripheral region such as pixels 22-3'. These pixels 22-3' may be non-operational or pass-through pixels. Path portion 68, if present, may similarly extend across and overlap some non-operational or pass-through pixels 22-2'. Each path portion 68 may therefore extend between the operational pixels in rows 22-2A and the left edge of pixel array 20. In other arrangements, operational pixels in columns 22-2A may extend to the left edge of pixel array 20 and path portion 68 overlapping non-operational pixels may be omitted.

As described in connection with FIG. 8, beyond the rectangular outline of pixel array 20 may be keep-out region or keep-out zone 50 on substrate 44. Keep-out region 50 may extend around all peripheral edges of pixel array 20 and define an area that extends beyond array 20 and is typically left devoid of electrical component and structures such as conductive metal traces, conductive contact pads, and conductive metal vias.

In the illustrative routing scheme shown in FIG. 8, the meandering pixel signal paths that couple peripheral rows of pixels 22-2A to the peripheral subset of interconnect structures 41-2 may make use of the portion of keep-out region 50 along the left edge of pixel array 20. In particular, path portion 64 may be formed from conductive structures (e.g., conductive metal traces) overlapping keep-out zone 50. Each path portion 64 may extend between and connect a corresponding path portion 68 and a corresponding path portion 62.

Because peripheral rows of pixels 22-2A are coupled to at least some of the peripheral subset of interconnect structures 41-2, these coupled interconnect structures 41-2 may be unavailable for coupling to peripheral rows of pixels 22-2B aligned to the peripheral subset of interconnect structures 41-2 along the x-dimension. In some instances, some of these pixels 22-2B may be buffer pixels or other types of non-active pixels that do not require connections to pixel control and/or readout circuitry via interconnect structures 44-2. In other instances, the peripheral subset of interconnect structures 44-1 may have some interconnect structures 44-1 that are reserved for connections to some of the rows of pixels 22-2B (e.g., one or more pixel rows 66) and therefore are not connected to peripheral rows of pixels 22-2A using path portions 62, 64, and 68. In other words, one or more pixel rows 66 may be coupled to corresponding interconnect structures 41-2 in the peripheral subset using linear signal paths similar to how central rows of pixels are coupled to the middle subset of interconnect structures 41-2.

An analogous routing scheme may be employed to couple peripheral rows in the bottom peripheral region of pixel array 20 to the corresponding bottom-side peripheral subset of interconnect structures 41-2. In particular, peripheral rows of pixels 22-2D may be coupled to the bottom-side peripheral subset of interconnect structures 41-2 via corresponding path portions 62, 64, and 68. Path portions 62 and 68 may overlap corresponding non-operational or pass-through pixels in different rows along in the same and/or different columns. Path portion 64 may also overlap keep-out region 50 along the left edge of pixel array 20. Columns of pixels 22-2C which are aligned to the peripheral subset of interconnect structures 41-2 along the x-dimension may omit connections to the peripheral subset of interconnect structures 41-2 or may be coupled to reserved interconnect structures 41-2 in the peripheral subset.

In illustrative configurations described herein as an example, interconnect structures 41-2 on die 40 mates with corresponding interconnect structures 43-2 on die 42 to connect to circuitry block 48-2 (FIG. 6). In arrangements in which circuitry block 48-2 implements pixel control circuitry (e.g., control circuitry 26 in FIG. 2), pixel signal paths routed to interconnect structures 41-2 may be referred to herein as pixel control paths. These pixel control paths may convey corresponding pixel control signals, such as charge transfer signals, pixel reset signals, gain control signals, anti-blooming signals, and/or other control signals provided to gate terminals of pixel transistors or other pixel element, from circuitry block 48-2 to at least a portion of pixel array 20. If desired, circuitry block 48-2 may implement pixel readout functions and may therefore receive pixel output signals over the pixel signal paths from the portion of pixel array 20.

While FIGS. 7 and 8 show how a single line (e.g., column or row) of pixels can be coupled to a corresponding inter-die interconnect structure 41 via a meandering signal path or a linear signal path, this is merely illustrative. If desired, multiple lines of pixels may be coupled to a single inter-die interconnect structure 41. As a first example, multiple columns of pixels such as pixels 22-3A (FIG. 7) may be coupled to and share a single pixel readout path to a single interconnect structure 41-1. In this first example, pixel output charge sharing, pixel output averaging, and/or other schemes may be used to perform a readout operation using a pixel readout path shared between different multiple pixel columns. As a second example, multiple rows of pixels such as pixels 22-2A (FIG. 8) may be coupled to and share a single pixel control path to a single interconnect structure 41-2. In this second example, a common control signals may be provided to perform a pixel control operation using a pixel control path shared between different multiple pixel rows.

Pixel signal paths such those formed from path portions 52, 54, and 58 (FIG. 7) and those formed from path portions 62, 64, and 68 (FIG. 7) may be formed from metal layers embedded in dielectric stack 47 (FIG. 3). These pixels signal paths may also include conductive via portions that connect different metal layers forming the path portions and that connect to interconnect structures 41. While pixel signal paths as described in connection with FIGS. 7 and 8 are described sometimes herein to be linear or have linear portions. The linearity of these structures refers to their linearity along the x-dimension and/or y-dimension (FIGS. 3, 7, and 8). These structures may include intervening conductive vias for inter-coupling at any suitable locations and therefore exhibit non-linear in the –z-dimension while remaining linear in the x-dimension and/or y-dimension (FIGS. 3, 7, and 8).

Figure 9:
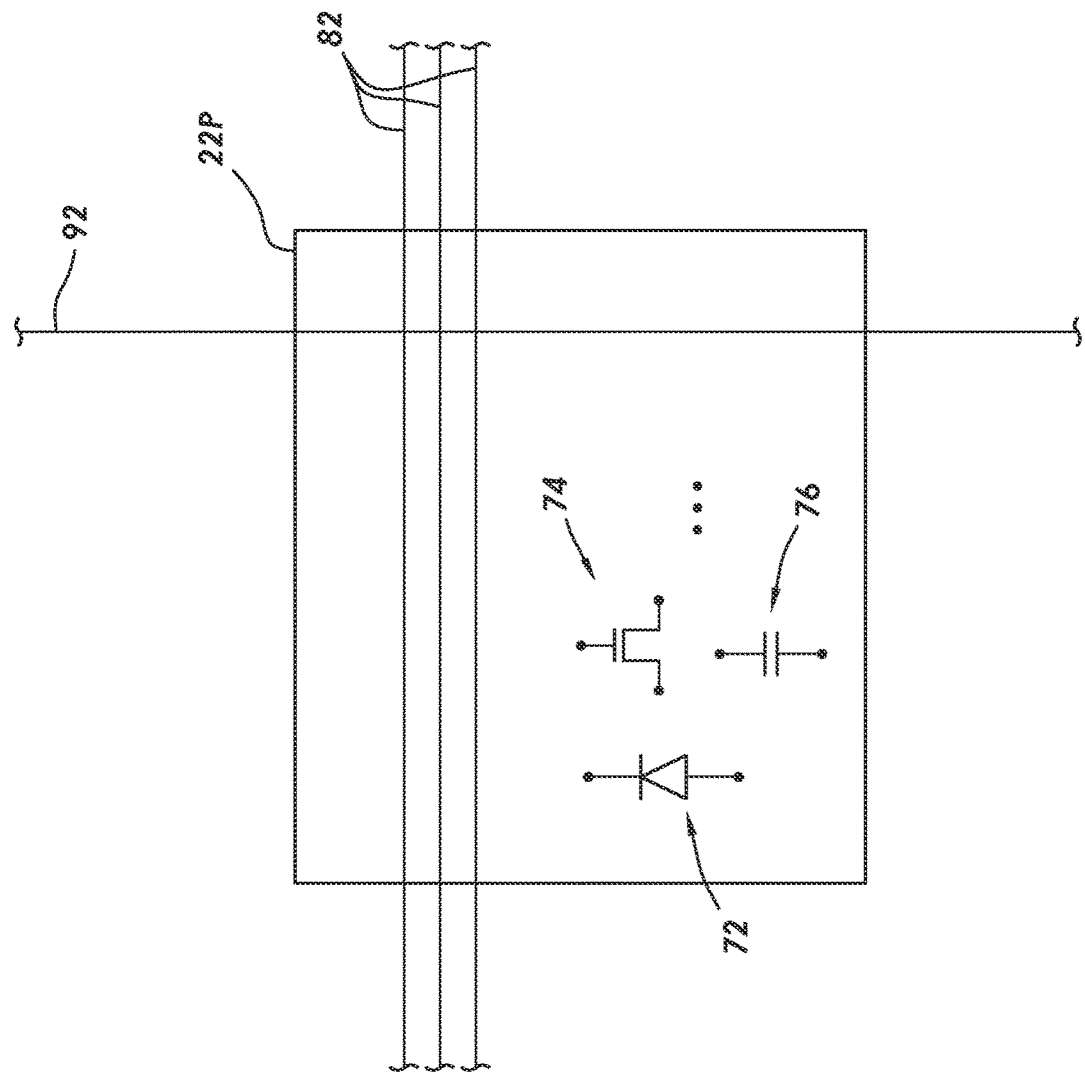
FIG. 9 is a diagram of an illustrative pass-through pixel in accordance with some embodiments.

FIG. 9 is an illustrative configuration of a pass-through pixel 22P. Pass-through pixel 22P may be used to implement each of pixels 22-2' and 22-3' in FIGS. 7 and 8, if desired. As shown in FIG. 9, pass-through pixel 22P may include one or more photosensitive elements such as photodiode(s) 72, transistors such as transistor(s) 74, charge storage structures such as capacitor(s) 76. Each these elements may be grounded (e.g., coupled to a reference voltage terminal) at one or more terminals. Pixel control signal paths 82 may overlap pixel 22P but may be decoupled (e.g., electrically disconnected) from each of the elements in pixel 22P. Signal paths 82 from pixels 22P may form path portions 62 and/or 68 in FIG. 8. Pixel readout path 92 may overlap pixel 22P may be decoupled (e.g., electrically disconnected) from each of the elements in pixel 22P. Signal paths 92 for different pixels 22P' may form path portions 52 and/or 58 in FIG. 7.

Various embodiments have been described illustrating pixel signal path routing for image sensor pixel arrays in image sensors.

As a first example, an image sensor may include an array of image sensor pixels having a first line of pixels and a second line of pixels. The image sensor may include a keep-out region that surrounds the array of image sensor pixels. The image sensor may include a pixel signal path coupled to the first line of pixels having a first path portion that overlaps the keep-out region and having a second path portion that overlaps at least one pixel in the second line of pixels. The at least one pixel in the second line of pixels may include a non-operational pixel having grounded terminals, if desired. The second path portion may include a pixel control line portion overlapping the non-operational pixel or a pixel readout line portion overlapping the non-operational pixel.

The image sensor may further include an inter-die interconnect structure. The pixel signal path may couple the first line of pixels to the inter-die interconnect structure. The array of image sensor pixels, the keep-out region, the pixel signal path, and the inter-die interconnect structure may be formed on a first integrated circuit die and the image sensor may include a second integrated circuit die to which the first integrated circuit die is attached and to which the inter-die interconnect structure is coupled.

In one illustrative arrangement, the image sensor may include pixel readout circuitry. The pixel signal path may include a pixel readout path coupling the first line of pixels to the pixel readout circuitry. The first line of pixels may include a first column of pixels and the second line of pixels may include a second column of pixels parallel to the first column of pixels. In another illustrative arrangement, the image sensor may include pixel control circuitry. The pixel signal path may include a pixel control path coupling the first line of pixels to the pixel control circuitry. The first line of pixels may include a first row of pixels and the second line of pixels may include a second row of pixels parallel to the first row of pixels.

If desired, the first line of pixels may include non-active pixels. The non-active pixels may include reference pixels that generate reference signals indicative of pixel noise, if desired. The non-active pixels may include optically dark pixels that are shielded from incident light, if desired.

As a second example, an image sensor may include an array of image sensor pixels containing active pixels and non-active pixels, a set of interconnect structures parallel to a first line of the non-active pixels and perpendicular to a second line of the non-active pixels, and a pixel signal path coupling the second line of the non-active pixels to an interconnect structure in the set of interconnect structures. The pixel signal path may overlap at least one non-active pixel in the first line of the non-active pixels. In particular, the at least one non-active pixel may be disconnected from the interconnect structure.

The array of image sensor pixels may include peripheral edges that define an outline of the array of image sensor pixels. The pixel signal path may have a portion that extends beyond at least one of the peripheral edges of the array of image sensor pixels.

In one illustrative arrangement, the first line of the non-active pixels may be arranged along a column in the array, the second line of the non-active pixels may be arranged along a row in the array, and the pixel signal path may have a first portion that extends along the row in the array and a second portion that extends along an additional row in the array that includes the at least one non-active pixel in the first line of the non-active pixels. In another illustrative arrangement, the first line of the non-active pixels may be arranged along a row in the array, the second line of the non-active pixels may be arranged along a column in the array, and the pixel signal path may have a first portion that extends along the column in the array and a second portion that extends along an additional column in the array that includes the at least one non-active pixel in the first line of the non-active pixels.

As a third example, an image sensor may include a first integrated circuit die having an array of image sensor pixels and may include a second integrated circuit die that overlaps the first integrated circuit die and is coupled to the first integrated circuit die via inter-die interconnect structures. The array of image sensor pixels may overlap the inter-die interconnect structures and a peripheral portion of the array of image sensor pixels may be coupled to at least one of the inter-die interconnect structures via a pixel signal path that extends beyond an outline of the array of image sensor pixels. If desired, the first integrated circuit die may include a keep-out zone that extends beyond the outline of the array of image sensor pixels and the pixel signal path may overlap the keep-out zone.

As illustrative arrangements, the pixel signal path may convey a pixel control signal from the second integrated circuit die to the peripheral portion of the array of image sensor pixels or may convey a pixel output signal from the peripheral portion of the array of image sensor pixels to the second integrated circuit die.

It will be recognized by one skilled in the art that the present exemplary embodiments may be practiced without some or all of these specific details. In other instances, well-known operations have not been described in detail in order not to unnecessarily obscure the present embodiments.

The foregoing is merely illustrative and various modifications can be made to the described embodiments. The foregoing embodiments may be implemented individually or in any combination.

What is claimed is:

1. An image sensor comprising:
   an array of image sensor pixels having a first line of pixels and a second line of pixels;
   a keep-out region that surrounds the array of image sensor pixels; and
   a pixel signal path coupled to the first line of pixels, the pixel signal path having a first path portion that overlaps the keep-out region and a second path portion that overlaps at least one pixel in the second line of pixels.

2. The image sensor defined in claim 1 further comprising:
   pixel readout circuitry, wherein the pixel signal path comprises a pixel readout path coupling the first line of pixels to the pixel readout circuitry.

3. The image sensor defined in claim 2, wherein the first line of pixels comprises a first column of pixels and wherein the second line of pixels comprises a second column of pixels parallel to the first column of pixels.

4. The image sensor defined in claim 1 further comprising:
   pixel control circuitry, wherein the pixel signal path comprises a pixel control path coupling the first line of pixels to the pixel control circuitry.

5. The image sensor defined in claim 4, wherein the first line of pixels comprises a first row of pixels and wherein the second line of pixels comprises a second row of pixels parallel to the first row of pixels.

6. The image sensor defined in claim 1 further comprising:
   an inter-die interconnect structure, wherein the pixel signal path couples the first line of pixels to the inter-die interconnect structure.

7. The image sensor defined in claim 6, wherein the array of image sensor pixels, the keep-out region, the pixel signal path, and the inter-die interconnect structure are formed on a first integrated circuit die and wherein the image sensor comprises a second integrated circuit die to which the first integrated circuit die is attached and to which the inter-die interconnect structure is coupled.

8. The image sensor defined in claim 1, wherein the first line of pixels comprises non-active pixels.

9. The image sensor defined in claim 8, wherein the non-active pixels comprise reference pixels that generate reference signals indicative of pixel array noise.

10. The image sensor defined in claim 8, wherein the non-active pixels comprise optically dark pixels that are shielded from incident light.

11. The image sensor defined in claim 1, wherein the at least one pixel in the second line of pixels comprises a non-operational pixel having one or more pixel transistors having grounded terminals.

12. The image sensor defined in claim 11, wherein the second path portion comprises a pixel control line portion overlapping the non-operational pixel or a pixel readout line portion overlapping the non-operational pixel.

13. The image sensor defined in claim 1, wherein the array of image sensor pixels comprises active pixels and non-active pixels.

14. The image sensor defined in claim 13, wherein the array of image sensor pixels has peripheral edges that define an outline of the array of image sensor pixels, wherein the keep-out region is beyond the peripheral edges of the array of image sensor pixels, and wherein the first path portion of the pixel signal path extends beyond at least one of the peripheral edges of the array of image sensor pixels.

15. The image sensor defined in claim 1 further comprising:
   a set of interconnect structures perpendicular to the first line of pixels and perpendicular to the second line of pixels.

16. The image sensor defined in claim 15, wherein the pixel signal path couples the first line of pixels to a given interconnect structure in the set of interconnect structures.

17. The image sensor defined in claim 15 further comprising:
   an additional set of interconnect structures parallel to the first line of pixels and parallel to the second line of pixels.

18. The image sensor defined in claim 17 further comprising
   a first integrated circuit die on which the array of image sensor pixels, the keep-out region, and the pixel signal path are disposed;
   a second integrated circuit die coupled to the first integrated circuit die via the set of interconnect structures and the additional set of interconnect structures.

19. An image sensor comprising:
   a first integrated circuit die that includes:
      an array of image sensor pixels having a first row of pixels and a second row of pixels;
      a region that surrounds the array of image sensor pixels; and
      a pixel signal path coupled to multiple pixels in the first row of pixels, the pixel signal path having a first path portion that overlaps the region and a second path portion that overlaps at least one pixel in the second row of pixels; and
   a second integrated circuit die attached to the first integrated circuit die.

20. An image sensor comprising:
   a first integrated circuit die that includes:
      an array of image sensor pixels having a first column of pixels and a second column of pixels;
      a region that surrounds the array of image sensor pixels; and
      a pixel signal path coupled to multiple pixels in the first column of pixels, the pixel signal path having a first path portion that overlaps the region and a second path portion that overlaps at least one pixel in the second column of pixels; and
   a second integrated circuit die attached to the first integrated circuit die.

* * * * *